US010792793B2

(12) United States Patent
Moss et al.

(10) Patent No.: US 10,792,793 B2
(45) Date of Patent: Oct. 6, 2020

(54) TOOL BITS WITH FLOATING MAGNET SLEEVES

(71) Applicant: Black & Decker Inc., New Britain, CT (US)

(72) Inventors: Darren B. Moss, York, PA (US); Michael P. Peters, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/986,861

(22) Filed: May 23, 2018

(65) Prior Publication Data
US 2020/0114498 A1 Apr. 16, 2020

Related U.S. Application Data

(60) Provisional application No. 62/527,375, filed on Jun. 30, 2017.

(51) Int. Cl.
*B25B 23/00* (2006.01)
*B23B 31/107* (2006.01)
(Continued)

(52) U.S. Cl.
CPC ...... *B25B 23/0035* (2013.01); *B23B 31/1071* (2013.01); *B25B 23/12* (2013.01); *B25B 21/00* (2013.01)

(58) Field of Classification Search
CPC ... B25B 23/0035; B25B 23/005; B25B 23/12; B25B 15/00; B23B 31/1071
See application file for complete search history.

(56) References Cited

U.S. PATENT DOCUMENTS 3,253,626 A 5/1966 Stillwagon, Jr. et al.
7,107,882 B1 * 9/2006 Chang .................. B25B 15/02
81/125
(Continued)

FOREIGN PATENT DOCUMENTS

EP 3061572 A1 8/2016
WO 2012110453 A1 8/2012

OTHER PUBLICATIONS

Hartnack, Kai—Extended European Search Report re: corresponding European Patent Appln. No. 18180898.1-1019—dated Mar. 15, 2019—10 pages—The Hague.

*Primary Examiner* — David B. Thomas
(74) *Attorney, Agent, or Firm* — Scott B. Markow

(57) ABSTRACT

A tool for driving threaded fasteners includes a tool bit extending along a longitudinal axis and including a rear shank of polygonal cross section, a front working end, and an intermediate portion having a front shoulder, a rear shoulder, and a reduced diameter annular groove. A floating magnet sleeve receivable over the tool bit includes a tubular body, retention member projecting radially inward from a rear end of the body, and a magnet disposed at a front end of the body. The sleeve is axially moveable by a float distance between rearward and forward positions such that the magnet can engage a fastener head coupled to the working end as the sleeve approaches the forward position. The float distance is less than a tip distance between a front end of the magnet and a front tip of the working end when the sleeve is in the rearward position.

20 Claims, 13 Drawing Sheets

(51) Int. Cl.
*B25B 23/12* (2006.01)
*B25B 21/00* (2006.01)

(56) References Cited

U.S. PATENT DOCUMENTS

| | | | |
|---|---|---|---|
| 9,156,147 B2 * | 10/2015 | Peters | B23B 31/10 |
| 9,227,309 B2 * | 1/2016 | Moss | B25B 23/0035 |
| 9,406,423 B1 * | 8/2016 | Tsai | B25B 23/02 |
| 9,505,108 B2 * | 11/2016 | Peters | B25B 23/12 |
| 9,597,783 B2 | 3/2017 | Zhang | |
| 9,833,887 B1 * | 12/2017 | Liu | B25B 23/12 |
| 9,943,946 B2 * | 4/2018 | Peters | B23B 31/107 |
| 10,022,847 B2 * | 7/2018 | Tsai | B25B 15/02 |
| 10,040,179 B2 * | 8/2018 | Peters | B23B 31/10 |
| 10,124,473 B2 * | 11/2018 | Wang | B25B 23/12 |
| 10,150,206 B2 * | 12/2018 | Ko | B25B 23/12 |
| 10,556,329 B2 * | 2/2020 | Peters | B23B 31/107 |
| 2015/0202751 A1 | 7/2015 | Chen | |
| 2016/0016298 A1 | 1/2016 | Zhang | |
| 2016/0023333 A1 | 1/2016 | Chen | |
| 2016/0089772 A1 | 3/2016 | Liu | |
| 2016/0279769 A1 | 9/2016 | Arslan | |
| 2017/0120427 A1 | 5/2017 | Tsai | |
| 2017/0120428 A1 * | 5/2017 | Wang | B25B 23/12 |
| 2019/0118357 A1 * | 4/2019 | Huang | B25B 23/12 |

* cited by examiner

TOOL BITS WITH FLOATING MAGNET SLEEVES

RELATED APPLICATIONS

This application claims the benefit of U.S. Provisional Application No. 62/527,375, filed Jun. 30, 2017, content of which is incorporated herein by reference in its entirety. In addition, the following related applications are hereby incorporated by reference: U.S. application Ser. No. 15/296,546 (now pending), filed Oct. 18, 2016; U.S. Provisional Application No. 62/249,403, filed Nov. 2, 2015; U.S. application Ser. No. 14/837,105, filed Aug. 27, 2015 (now pending); U.S. application Ser. No. 14/817,323, filed Aug. 4, 2015 (now pending); U.S. application Ser. No. 14/285,799, filed May 23, 2014 (now U.S. Pat. No. 9,505,108); U.S. application Ser. No. 13/967,775, filed Aug. 15, 2013 (now U.S. Pat. No. 9,227,309); U.S. application Ser. No. 13/766,135, filed Feb. 13, 2013 (now U.S. Pat. No. 9,156,147); U.S. Provisional Application No. 61/599,222, filed Feb. 15, 2012; Taiwan Utility Model Application No. 103214649, filed Aug. 15, 2014; and, Chinese Utility Model Application No. 201420463546.6, filed Aug. 15, 2014.

TECHNICAL FIELD

This application relates to tool bits for driving threaded fasteners, alone and together with floating magnet sleeves.

BACKGROUND

Tool bits for driving threaded fasteners are commonly used with power tools. It may be desirable to use a magnet to help retain a fastener to be driven by the tool bit. The aforementioned related applications disclose several embodiments of floating magnet sleeves received over fastening bits to help retain the fastener heads on the tool bits. However, such floating magnet sleeves do not always work as intended, and can be difficult to install and remove from the tool bits.

SUMMARY

The present application relates to fastening tools, such as tool bits for driving threaded fasteners, and floating magnet sleeves, the designs of which have been refined and optimized to more reliably engage a threaded fastener being driven by the tool bit, and to facilitate more reliable and easier installation and removal of the floating magnet sleeve from the tool bit.

In an aspect, a tool for driving threaded fasteners includes a tool bit and a floating magnet sleeve. The tool bit extends along a longitudinal axis. A rear shank of polygonal cross section is configured to be coupled to a tool bit holder of a power tool. A front working end is configured to engage a head of a threaded fastener. An intermediate portion between the rear shank portion and the front working end includes a front shoulder proximate the working end, a rear shoulder proximate the shank, and a reduced diameter annular groove disposed between the front shoulder and the rear shoulder. The floating magnet sleeve is receivable over the tool bit and includes a tubular body, a retention member projecting radially inward from a rear end of the body, and a magnet disposed at a front end of the body. The sleeve is removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position. The float distance is less than a tip distance between a front end of the magnet and a front tip of the working end when the sleeve is in the rearward position.

Implementations of this aspect may include one or more of the following features. The tip distance may be greater than or equal to a maximum depth to which the working end penetrates a head of a threaded fastener. The tip distance minus the float distance may be less than or equal to a minimum depth to which the working end penetrates a head of a threaded fastener. The working end may be a PH2 head, the tip distance is between approximately 2.50 mm and approximately 3.77 mm, and the float distance may be approximately 2.02 mm. The working end may be a SQ2 head, the tip distance may be between approximately 2.48 mm and 3.00 mm, and float distance may be approximately 1.35 mm. The working end may be a T20 head, the tip distance may be between approximately 2.17 mm and 2.57 mm, and the float distance may be approximately 1.17 mm. The working end may be a T25 head, the tip distance may be between approximately 2.49 mm and 3.33 mm, and the float distance may be approximately 1.55 mm. The ratio between the float distance and the tip distance may be approximately 40% to 75%, e.g., approximately 45% to 67%. The tip distance and the float distance may be configured so that the floating magnet sleeve will float to engage the heads of at least 80% of the fasteners of a type engageable by the working end. The retention member may comprise at least one of an O-ring, a C-clip, and a ball. The magnet may comprise a ring shaped magnet disposed in a front end of the sleeve. The shank may have a hex shank with a ball groove. The working end may include one of a flat head, a Phillips head, a square drive head, a hex head, a star shaped head, and a Torx head. A reduced diameter torsion zone may be disposed between the shank and the rear shoulder. A reduced diameter groove for receiving a product label ring may be disposed between the shank and the rear shoulder.

In another aspect, a tool for driving threaded fasteners includes a tool bit and a floating magnet sleeve. The tool bit extends along a longitudinal axis. A rear shank of polygonal cross section is configured to be coupled to a tool bit holder of a power tool. A front working end is configured to engage a head of a threaded fastener. An intermediate portion between the rear shank portion and the front working end includes a front shoulder proximate the working end, a rear shoulder proximate the shank, and a reduced diameter annular groove disposed between the front shoulder and the rear shoulder. The floating magnet sleeve is receivable over the tool bit and includes a tubular body, a retention member projecting radially inward from a rear end of the body, and a magnet disposed at a front end of the body. The sleeve is removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position. The annular groove has a first diameter, the front shoulder has a second diameter that is greater than the first diameter, and the rear shoulder has a third diameter that is greater than the second diameter.

Implementations of this aspect may include one or more of the following features. The first diameter may be approximately 5.0 mm to approximately 5.9 mm, the second diameter may be approximately 6.0 mm to approximately 6.9 mm, and the third diameter may be approximately 7.0 mm to approximately 8.0 mm. The first diameter may be approximately 5.45 mm, the second diameter may be approximately 6.4 mm, and the third diameter may be approximately 7.18 mm. The annular groove may have a circular cross-section with the first diameter measured across the circular cross-section, the front shoulder may have a partially circular and partially polygonal cross-section with the second diameter being measured at a maximum distance across the partially circular and partially polygonal cross-section, and the rear shoulder may have a polygonal cross-section with the third diameter being measured at a maximum distance across the polygonal cross section. The polygonal cross-section of the rear shoulder may be a hexagonal cross-section and the third diameter may be measured from one vertex to an opposite vertex on the hexagonal cross-section. The retention member may comprise at least one of an O-ring, a C-clip, and a ball. The magnet may comprise a ring shaped magnet disposed in a front end of the sleeve. The shank may have a hex shank with a ball groove. The working end may include one of a flat head, a Phillips head, a square drive head, a hex head, a star shaped head, and a Torx head. A reduced diameter torsion zone may be disposed between the shank and the rear shoulder. A reduced diameter groove for receiving a product label ring may be disposed between the shank and the rear shoulder.

In another aspect, a tool for driving threaded fasteners includes a tool bit and a floating magnet sleeve. The tool bit extends along a longitudinal axis. A rear shank of polygonal cross section is configured to be coupled to a tool bit holder of a power tool. A front working end is configured to engage a head of a threaded fastener. An intermediate portion between the rear shank portion and the front working end includes a front shoulder proximate the working end, a rear shoulder proximate the shank, and a reduced diameter annular groove disposed between the front shoulder and the rear shoulder. The floating magnet sleeve is receivable over the tool bit and includes a tubular body, a retention member projecting radially inward from a rear end of the body, and a magnet disposed at a front end of the body. The sleeve is removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position. The front shoulder has a first ramped portion at a front end of the front shoulder adjacent the working end and a second ramped portion at a rear end of the front shoulder adjacent the annular groove. The first ramped portion is disposed at a first angle to the longitudinal axis. The second ramped portion is disposed at a second angle to the longitudinal axis. The first angle is less than the second angle so that installation of the sleeve over the front shoulder requires less axial force than removal of sleeve over the front shoulder.

Implementations of this aspect may include one or more of the following features. The first angle may be approximately 40-50 degrees, e.g., approximately 45 degrees, and the second angle may be approximately 60-70 degrees, e.g., approximately 65 degrees. A front end of the rear shoulder may be disposed at a third angle to the longitudinal axis that is greater than both the first angle and the second angle. The front end of the rear shoulder may be approximately perpendicular to the longitudinal axis. The annular groove may have a first diameter, the front shoulder may have a second diameter that is greater than the first diameter, and the rear shoulder may have a third diameter that is greater than the second diameter. The retention member may comprise at least one of an O-ring, a C-clip, and a ball. The magnet may comprise a ring shaped magnet disposed in a front end of the sleeve. The shank may have a hex shank with a ball groove. The working end may include one of a flat head, a Phillips head, a square drive head, a hex head, a star shaped head, and a Torx head. A reduced diameter torsion zone may be disposed between the shank and the rear shoulder. A reduced diameter groove for receiving a product label ring may be disposed between the shank and the rear shoulder.

Advantages may include one or more of the following. The front shoulder of the tool bits allows the floating magnet sleeve to be installed onto the tool bit easily, and retained during use. The dimensions and configuration of the annular groove allows floating magnet sleeve to jump forward to virtually all fasteners for greater retention and single handed use. The tool bit with the floating magnet sleeve have a narrow width to easily see work and provide access to cramped spaces. The tool bit may have an overall length of 41 mm or 1.61", which will outperform a standard 1" tool bits in torsion. These and other advantages and features will be apparent from the description and the drawings.

DETAILED DESCRIPTION

Figure 1:
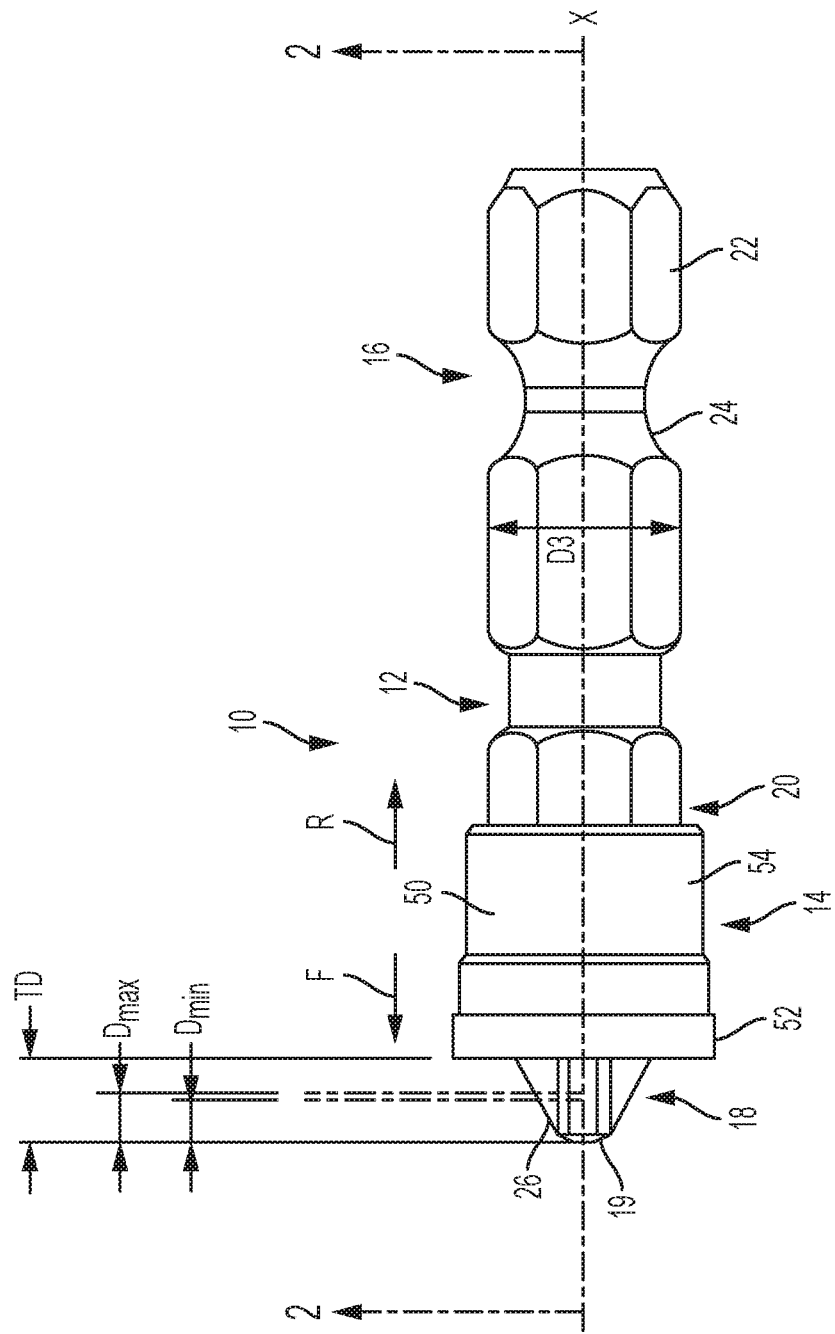
FIG. 1 is a side view of a first embodiment of a tool bit with a floating magnet sleeve.

Referring to FIGS. 1-4E, in one embodiment, a tool 10 for driving threaded fasteners includes a tool bit 12 and a floating magnet sleeve 14 removably received over the tool bit 12. The tool bit 12 includes extends along a longitudinal axis X and includes a rear shank portion 16, a front working end 18, and an intermediate portion 20 between the rear shank portion 16 and the front working end 18. The rear shank portion 16 has a polygonal (e.g., hexagonal) cross section 22 and an annular ball groove 24 so that the rear shank portion 16 is configured to be coupled to a tool bit holder or chuck of a power tool (e.g., a drill, impact driver, or screwdriver). The front working end 18 is configured to engage a head of a threaded fastener. In the embodiment shown in FIGS. 1-4D, the front working end 18 has a Phillips #2 (PH2) geometry 26 for engaging a Phillips #2 head threaded fastener. It should be understood that the front working end 18 may have other configurations for engaging other types of threaded fastener heads, such as Phillips #1, Phillips #3, flat head, square, hex, star, and Torx (e.g., T20, T25, etc.).

The intermediate portion 20 includes a front shoulder 28 proximate the working end 18, a rear shoulder 30 proximate the shank 16, and a reduced diameter annular groove 32 disposed between the front shoulder 28 and the rear shoulder 30. The intermediate portion 20 optionally may further include a second reduced diameter portion 33 between the rear shoulder 30 and the shank 16. In one embodiment, the second reduced diameter 33 may comprise a torsion zone that twists and takes up stresses in response to excessive torque loads on the tool bit 12. In another embodiment, the second reduced diameter portion 33 may comprise a groove for receiving a product label ring 31 disposed between the shank 16 and the rear shoulder 30.

Figure 4D:
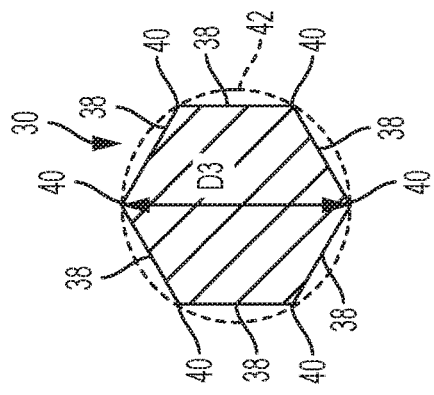
FIG. 4D is a cross-sectional view of the tool bit of FIG. 3, taken along line 4D-4D.
Figure 4C:
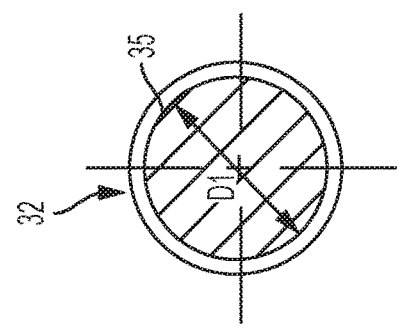
FIG. 4C is a cross-sectional view of the tool bit of FIG. 3, taken along line 4C-4C.
Figure 4B:
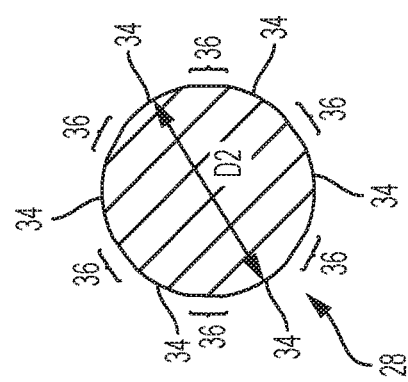
FIG. 4B is a cross-sectional view of the tool bit of FIG. 3, taken along line 4B-4B.
Figure 4A:
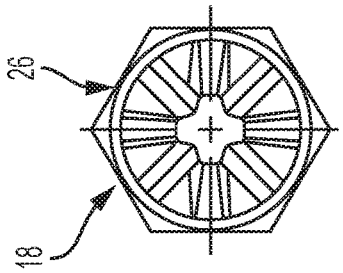
FIG. 4A is a front view of the tool bit of FIG. 3.

As shown in FIG. 4C, the annular groove 32 has a circular cross section 35 with a first diameter D1. As shown in FIG. 4B, the front shoulder 28 has a nearly circular and partially polygonal cross-section with six arc-shaped portions 34 interposed with six short flat portions 36. The front shoulder 28 has a second diameter D2 (measured across the arc shaped portions 34), which is greater than the first diameter. As shown in FIG. 4D, the rear shoulder 30 has a polygonal (e.g., hex shaped) cross section defined by flat walls 38 connected by vertices 40. The rear shoulder 30 has a third diameter D3 (i.e., the maximum distance across the polygonal cross-section), which is greater than the second diameter D2, measured across a circle 42 defined by the vertices 40. In one embodiment, the first diameter is approximately 5.0 mm to approximately 5.9 mm (e.g., approximately 5.45 mm), the second diameter is approximately 6.0 mm to approximately 6.9 mm (e.g., approximately 6.4 mm), and the third diameter is approximately 7.0 mm to approximately 8.0 mm (e.g., approximately 7.18 mm). In the illustrated embodiment, the rear shoulder 30 has the same cross-sectional shape and size as the polygonal portion 22 of the shank 16, although it should be understood that the cross-sectional shape and/or size of the rear shoulder 30 may be different than the polygonal portion 22 of the shank 16.

Figure 4E:
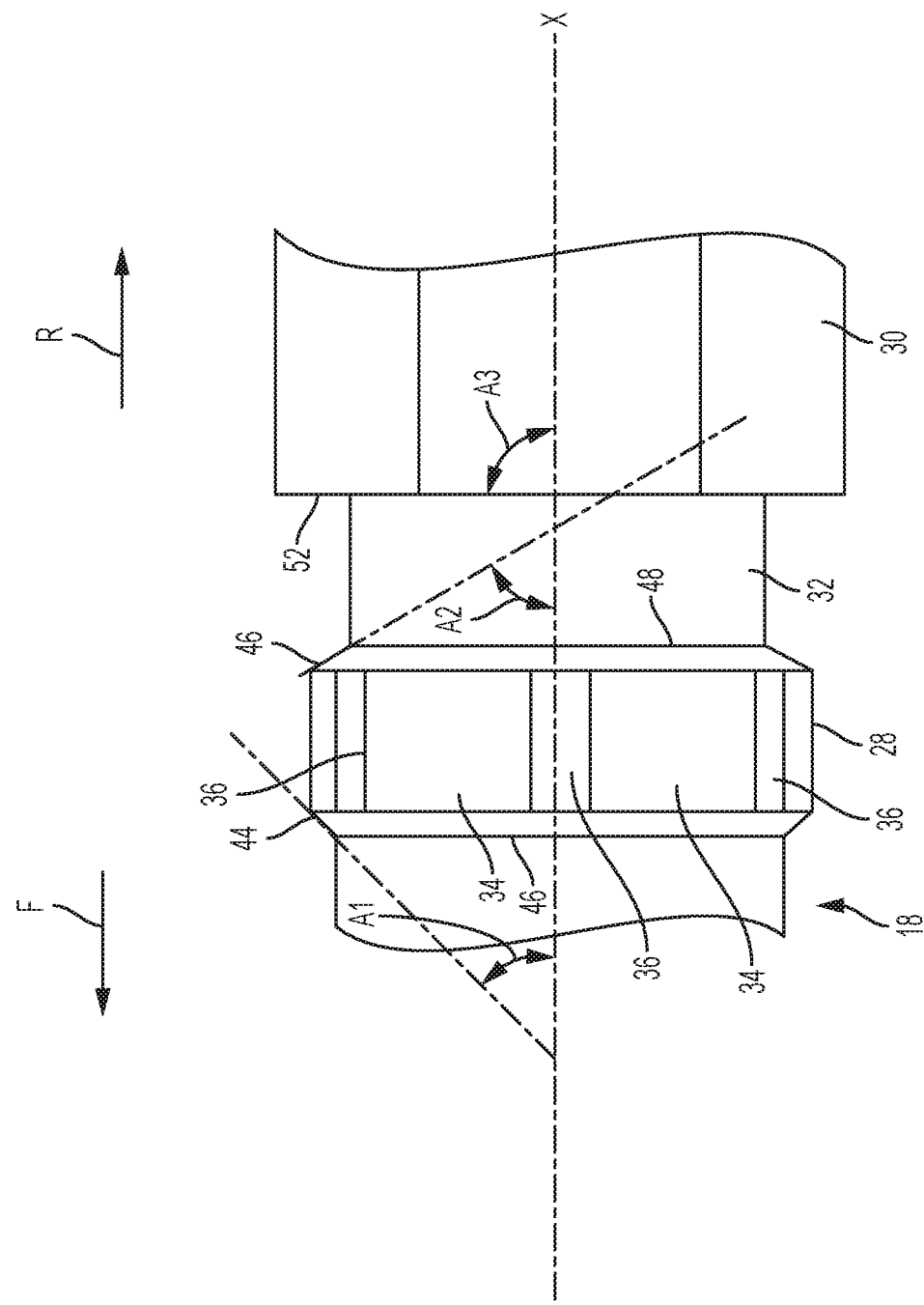
FIG. 4E is a close up view of the intermediate portion of the tool bit of FIG. 3.

As shown in FIG. 4E, the front shoulder 28 has a first ramped portion 44 at a front end 46 of the front shoulder 28 adjacent the working end 18 and a second ramped portion 46 at a rear end 48 of the front shoulder 28 adjacent the annular groove 32. The first ramped portion 44 is disposed at a first angle A1 relative to the longitudinal axis X, while the second ramped portion 46 being disposed at a second angle A2 to the longitudinal axis X. The rear shoulder 30 has a front wall 52 disposed at a third angle A3 to the longitudinal axis. The first angle A1 is less than the second angle A2 so that installation of the sleeve 14 over the front shoulder 28 in a rearward direction R requires less axial force than removal of sleeve 14 over the front shoulder in a forward direction F. The third angle A3 is greater than both the first angle A1 and the second angle A2 in order to inhibit the sleeve 14 from moving in the rearward direction R beyond the rear shoulder 30. In one embodiment, the first angle is approximately 40° to approximately 50° (e.g., approximately 45°), the second angle is approximately 60° to approximately 70° (e.g., approximately 65°), and the third angle is approximately 80° to approximately 100° (e.g., approximately perpendicular to the axis X).

Figure 2:
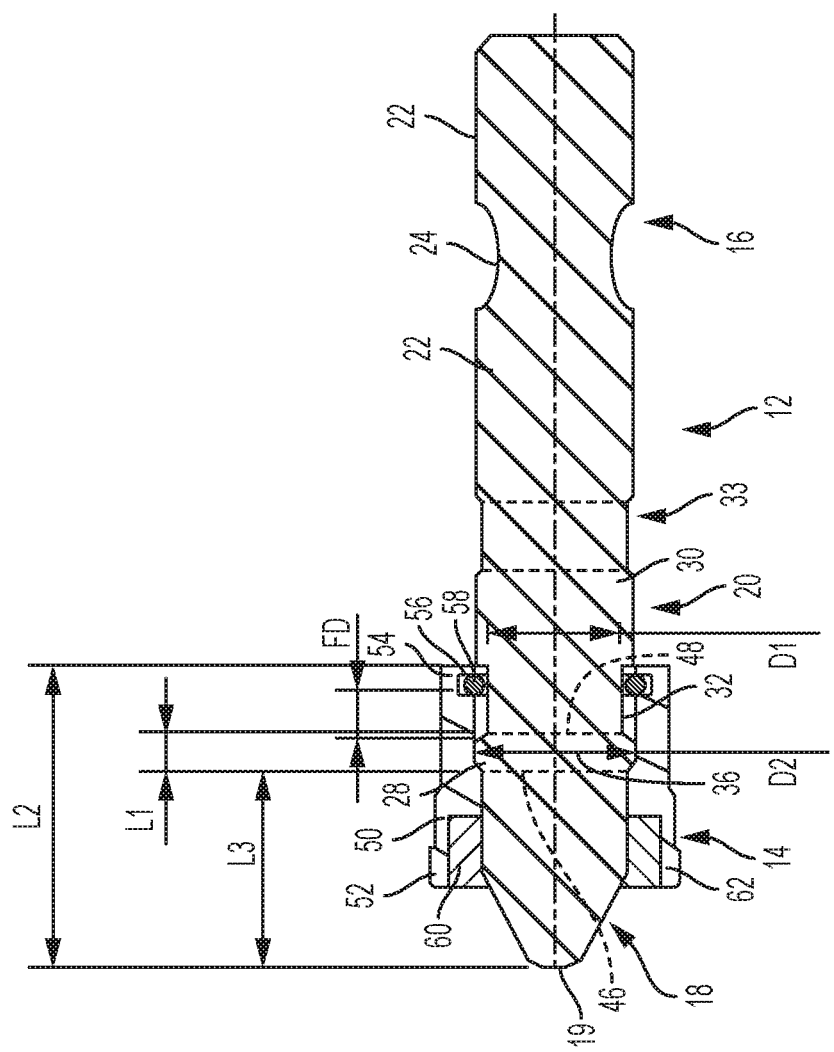
FIG. 2 is cross-sectional view of the tool bit and floating magnet sleeve of FIG. 1, taken along line 2-2.
Figure 3:
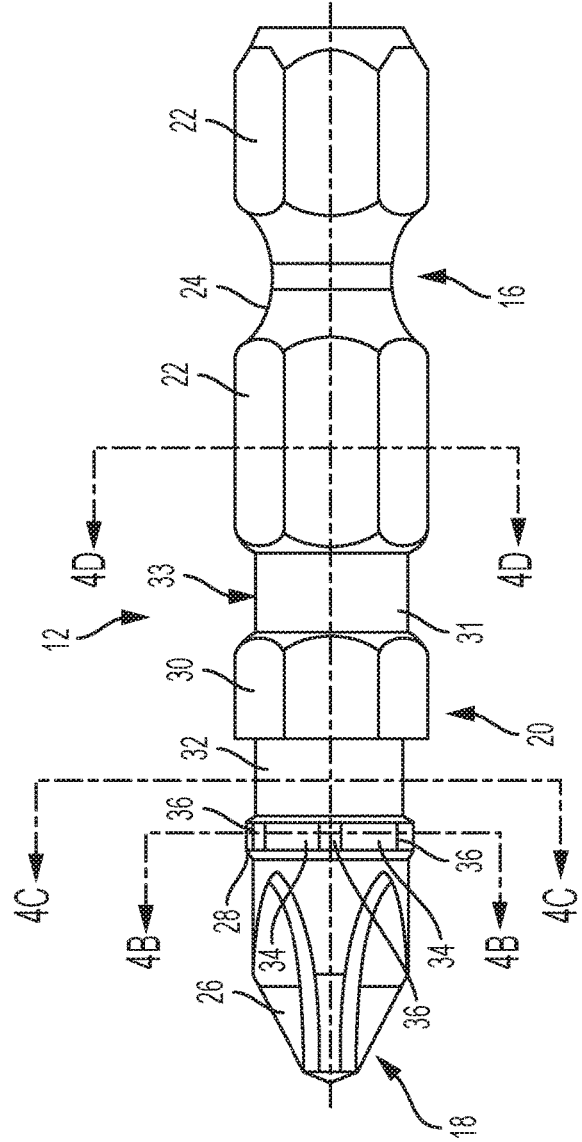
FIG. 3 is side view of the tool bit of FIG. 1.

Referring to FIG. 2, the front end 46 of the front shoulder 28 is disposed an axial length L3 from a tip 19 of the working end 18, such as approximately 7 mm to approximately 9 mm (e.g., approximately 8.57 mm). The front shoulder 28 has an axial length L1 between its front end 46 and the rear end 48, such as approximately such as approximately 1.4 mm to approximately 1.7 mm (e.g., approximately 1.55 mm). The front end of the rear shoulder 20 is disposed an axial length L2 from the tip 19 of the working end 18, such as approximately 12 mm to approximately 14 mm (e.g., approximately 13 mm).

As shown in FIGS. 1 and 2, the floating magnet sleeve 14 includes a generally tubular body 50 having a front end 52 and a rear end 54. Disposed in an annular groove 56 inside the rear end 54 of the body 50 is a retention member 58 that projects radially inward from a rear end 54 of the body 50 toward an interior of the tubular body 50. In the illustrated embodiment, the retention member 58 comprises an O-ring or an elastic C-clip. Other embodiments of retention members 58, such as a ball, a spring band, etc., can be found in the aforementioned related patent applications listed in the first paragraph of this application. A magnet 60, e.g., a ring shaped magnet, is disposed in an internal groove 60 in the front end 52 of the body 50. The sleeve 14 is removably receivable over the working end 18 and the intermediate portion 20 of the tool bit 12 with the retention member 58 disposed in the annular groove 32 between the front shoulder 36 and the rear shoulder 30. The sleeve 14 is configured to float axially by a float distance FD between a rearward position where the retention member 58 abuts the rear shoulder 20 and a forward position where the retention member 58 abuts the front shoulder 36, such that the magnet 60 can engage a head of a fastener coupled to and being driven by the working end 18, as the sleeve approaches its forward position.

The dimensions of the tool bit 12 have been optimized to enable the magnet sleeve 14 to be able to jump from the rearward position in the forward direction F to engage at least 80% of fasteners of the type driven by the working end 18. Referring to FIGS. 1 and 2, because different fasteners of the same type have somewhat different sizes and shapes of heads (e.g., some have flat heads, while others have dome shaped heads), the heads of the working end 18 can be inserted a different depth into the heads of various fasteners. It can be determined that the working end 18 will be inserted into the heads of existing fasteners by a depth that is between a minimum depth and maximum depth. For example, for the illustrated PH2 tool bit, it has been determined that at least 80% of fastener heads engage the working end 18 at a depth between a minimum depth Dmin of approximately 1.7 mm and a maximum depth Dmax of approximately 2.5 mm. A maximum tip distance TD between the front of the magnet 60 and the tip 19 of the tool bit 12—when the sleeve 14 is in its rearward position with the retention member 58 abutting the rear shoulder 20—must be greater than the maximum depth so that there is sufficient space for the working end 18 to engage the fastener heads. For example, for the illustrated PH2 tool bit, the tip distance TD is greater or equal to approximately 2.5 mm (e.g., between approximately 2.5 mm and 4.0 mm).

At the same time, the float distance FD—i.e., the amount of distance that the sleeve 14 floats between the rear position and the forward position—must be sufficiently small so that the magnet will be able to "jump" forward to engage a fastener head, while being sufficiently large to enable the wide range of fasteners to engage the working end 18. For this function to work, it has been determined the float distance FD should be less than the tip distance TD. For example, in the illustrated embodiment, the float distance is approximately 1.8 mm to approximately 2.1 mm (e.g., approximately 2.02 mm). In another aspect, it has been determined that the ratio between the float distance FD and the tip distance TD should be between 40% and 75% (e.g., between 45% and 65%). These dimensions optimize operation of the tool bit 12 and the sleeve 14 to enable at least 80% of PH2 fasteners to be automatically engaged by the magnet 60 when they are being driven by the PH2 working end 18.

Figure 5A:
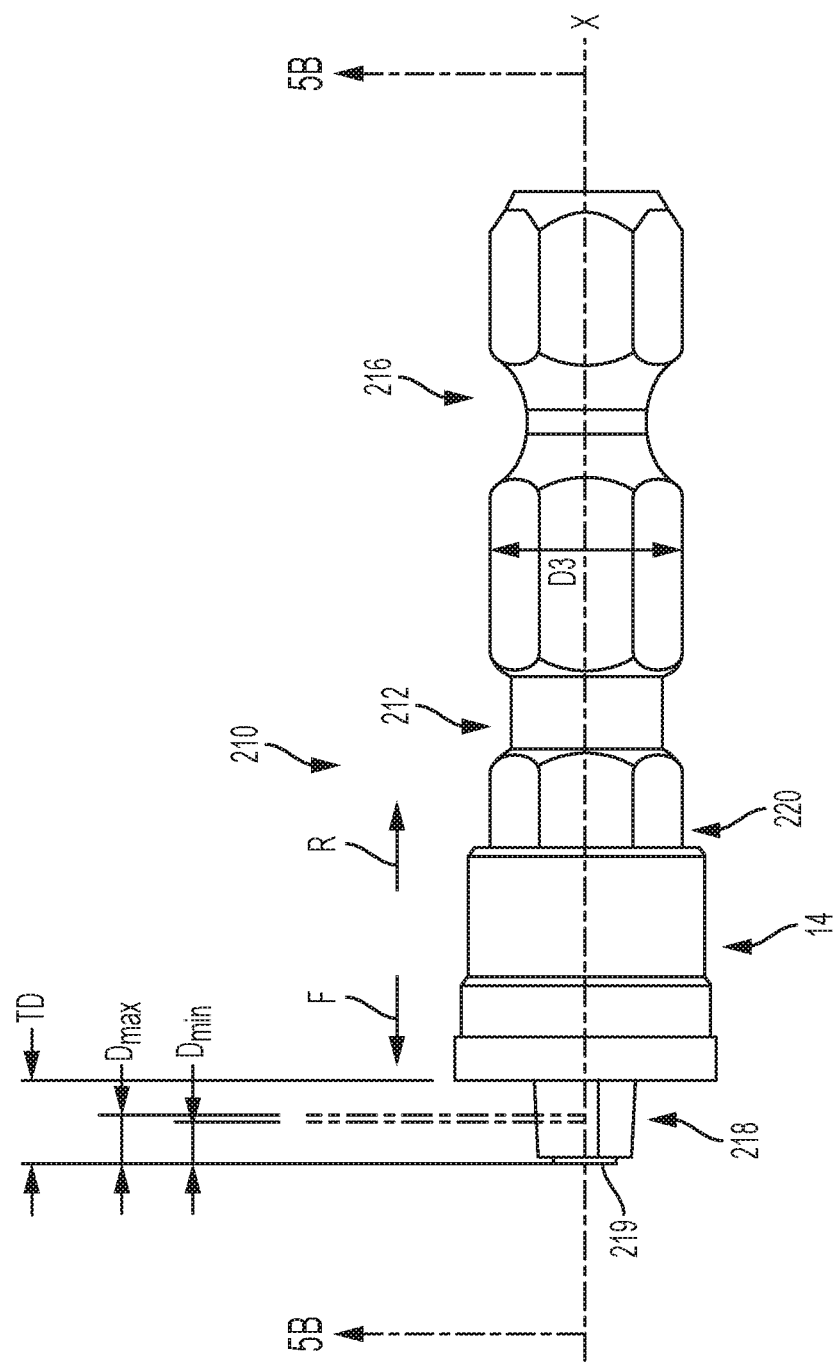
FIG. 5A is a side view of a second embodiment of a tool bit with a floating magnet sleeve.
Figure 5B:
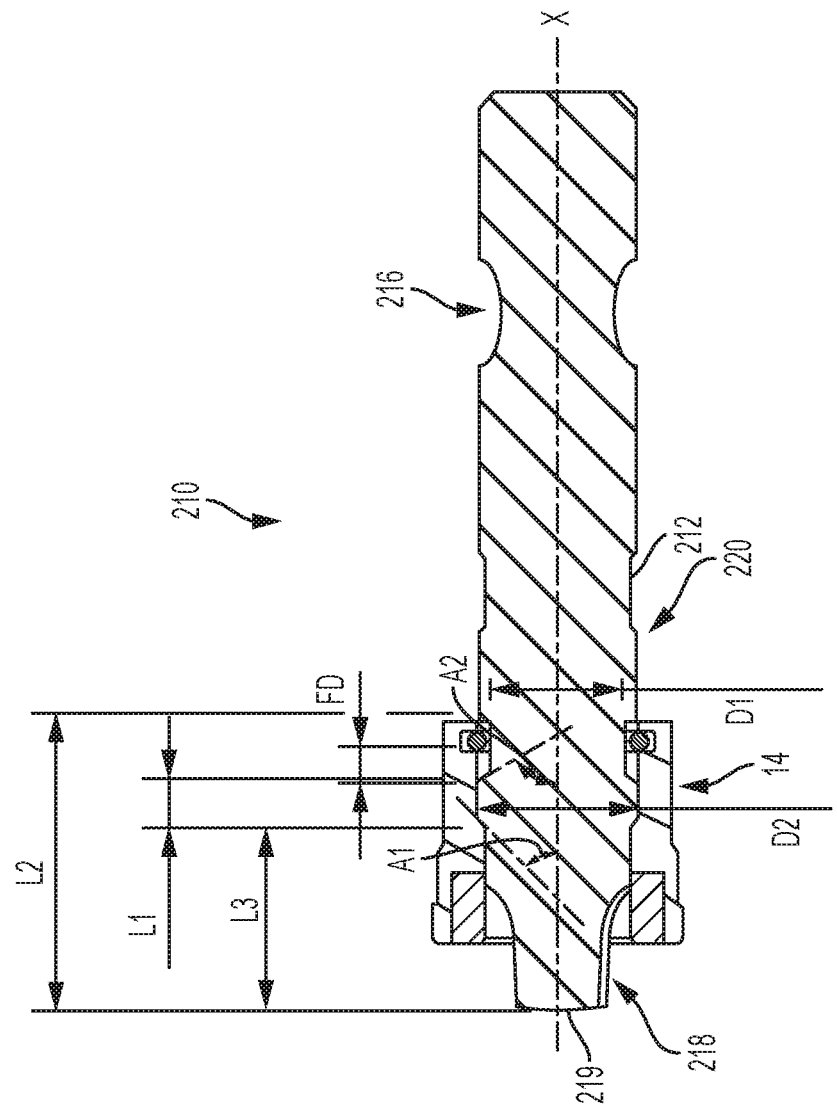
FIG. 5B is cross-sectional view of the tool bit and floating magnet sleeve of FIG. 5A, taken along line 5B-5B.
Figure 5C:
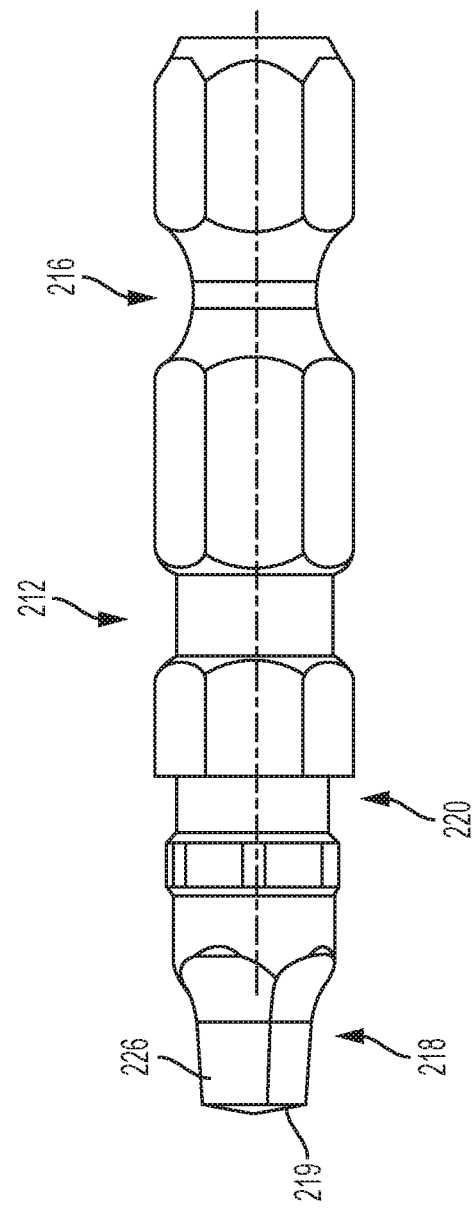
FIG. 5C is side view of the tool bit of FIG. 5A.
Figure 5D:
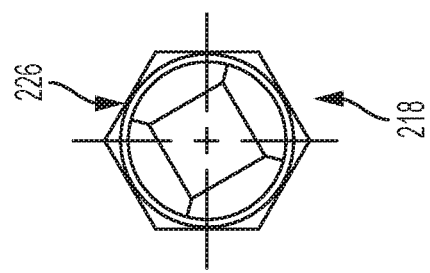
FIG. 5D is a front view of the tool bit of FIG. 5C.

Referring to FIGS. 5A-5C, in another embodiment, a tool 210 for driving threaded fasteners includes a tool bit 212, similar to tool bit 12, and the same floating magnet sleeve 14, which can also be removably received over the tool bit 212. The tool bit 212 extends along a longitudinal axis X and includes a rear shank portion 216, a front working end 218, and an intermediate portion 220 between the rear shank portion 216 and the front working end 218. The rear shank portion 216 is identical to the rear shank portion 16 in the tool bit 12. The front working end 218 differs from the working end 16 of the tool bit 12 insofar as it has a Square Drive #2 (SQ2) geometry 226 for engaging a SQ2 head of a threaded fastener. The intermediate portion 220 has the same configuration as the intermediate portion 20, except that the dimensions and angles have been modified so that the bit has been optimized so that the floating magnet sleeve 14 will engage and work with at least 80% of fasteners with SQ2 heads. The optimized dimensions for the SQ2 embodiment of the tool bit 212 are set forth in Table 1 below.

Figure 6A:
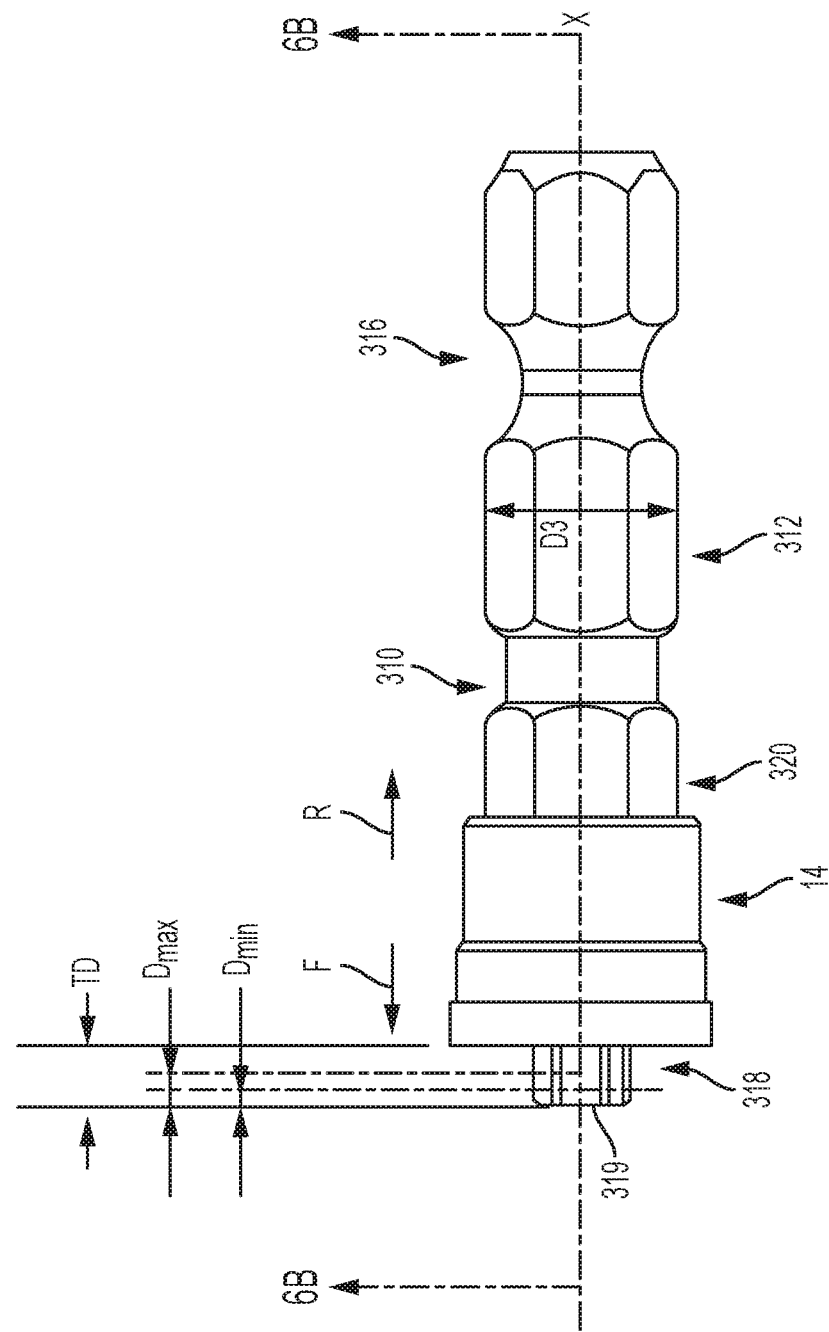
FIG. 6A is a side view of a third embodiment of a tool bit with a floating magnet sleeve.
Figure 6B:
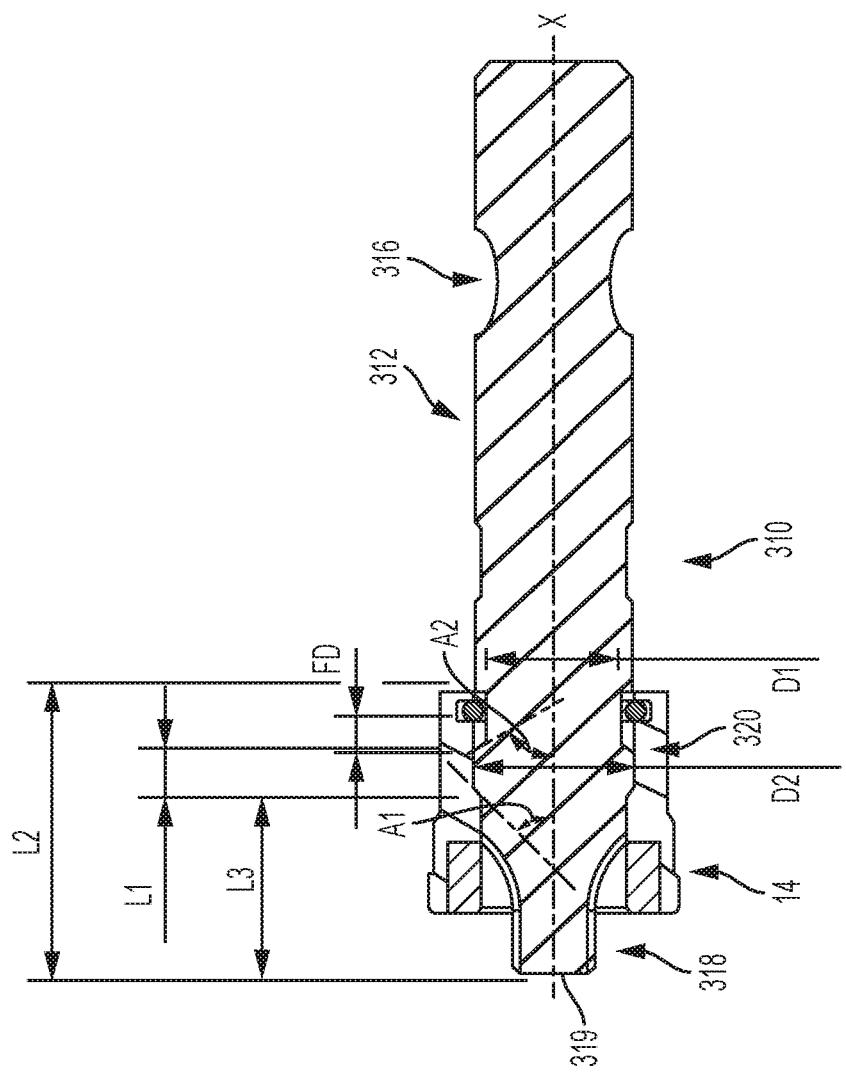
FIG. 6B is cross-sectional view of the tool bit and floating magnet sleeve of FIG. 6A, taken along line 6B-6B.
Figure 6C:
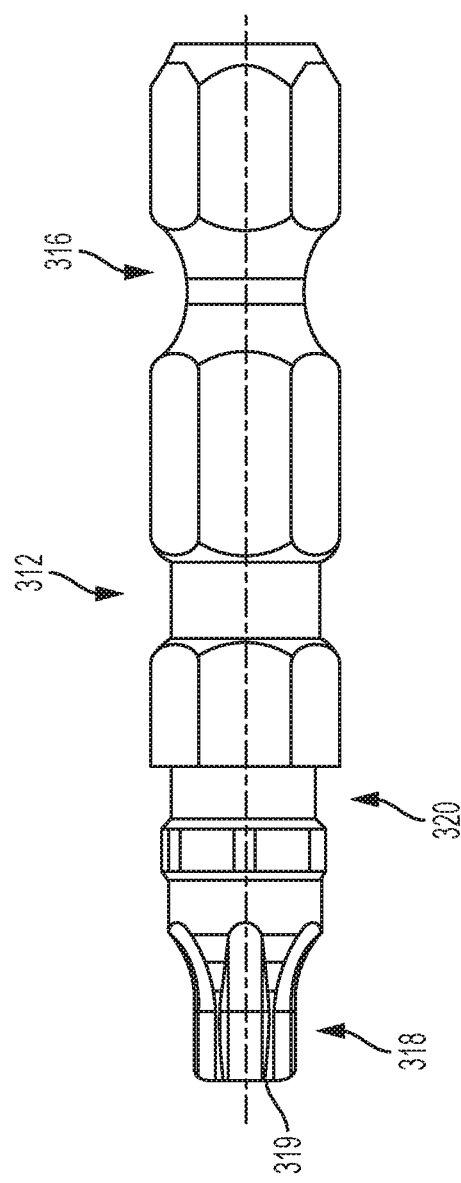
FIG. 6C is side view of the tool bit of FIG. 6A.
Figure 6D:
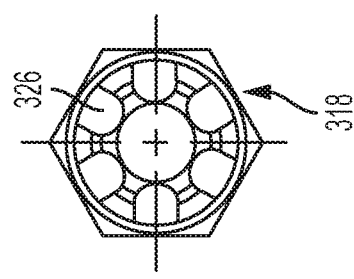
FIG. 6D is a front view of the tool bit of FIG. 6C.

Referring to FIGS. 6A-6C, in another embodiment, a tool 310 for driving threaded fasteners includes a tool bit 312, similar to tool bit 12, and the same floating magnet sleeve 14, which can also be removably received over the tool bit 312. The tool bit 312 extends along a longitudinal axis X and includes a rear shank portion 316, a front working end 318, and an intermediate portion 320 between the rear shank portion 316 and the front working end 318. The rear shank portion 316 is identical to the rear shank portion 16 in the tool bit 12. The front working end 318 differs from the working end 16 of the tool bit 12 insofar as it has a Torx® T20 geometry 326 for engaging a Torx® T20 head of a threaded fastener. The intermediate portion 320 has the same configuration as the intermediate portion 20, except that the dimensions and angles have been modified so that the bit has been optimized so that the floating magnet sleeve 14 will engage and work with at least 80% of fasteners with Torx® T20 heads. The optimized dimensions for the Torx® T20 embodiment of the tool bit 312 are set forth in Table 1 below.

Figure 7A:
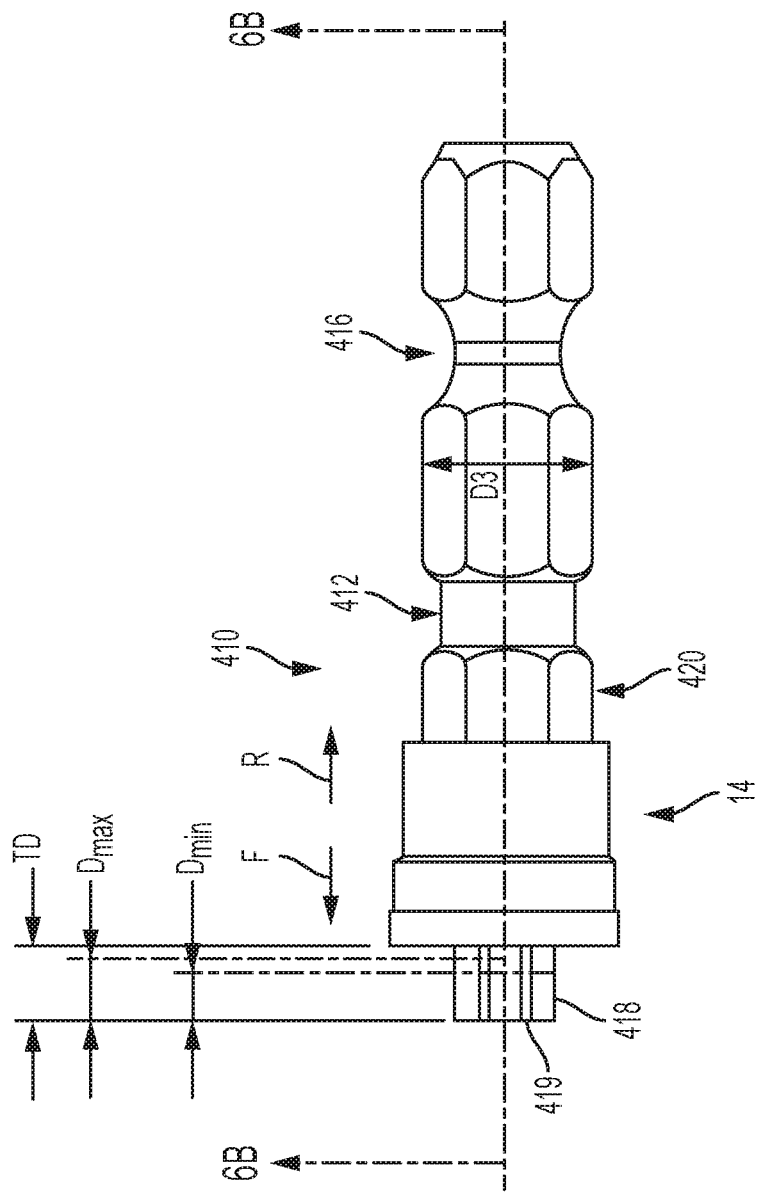
FIG. 7A is a side view of a fourth embodiment of a tool bit with a floating magnet sleeve.
Figure 7B:
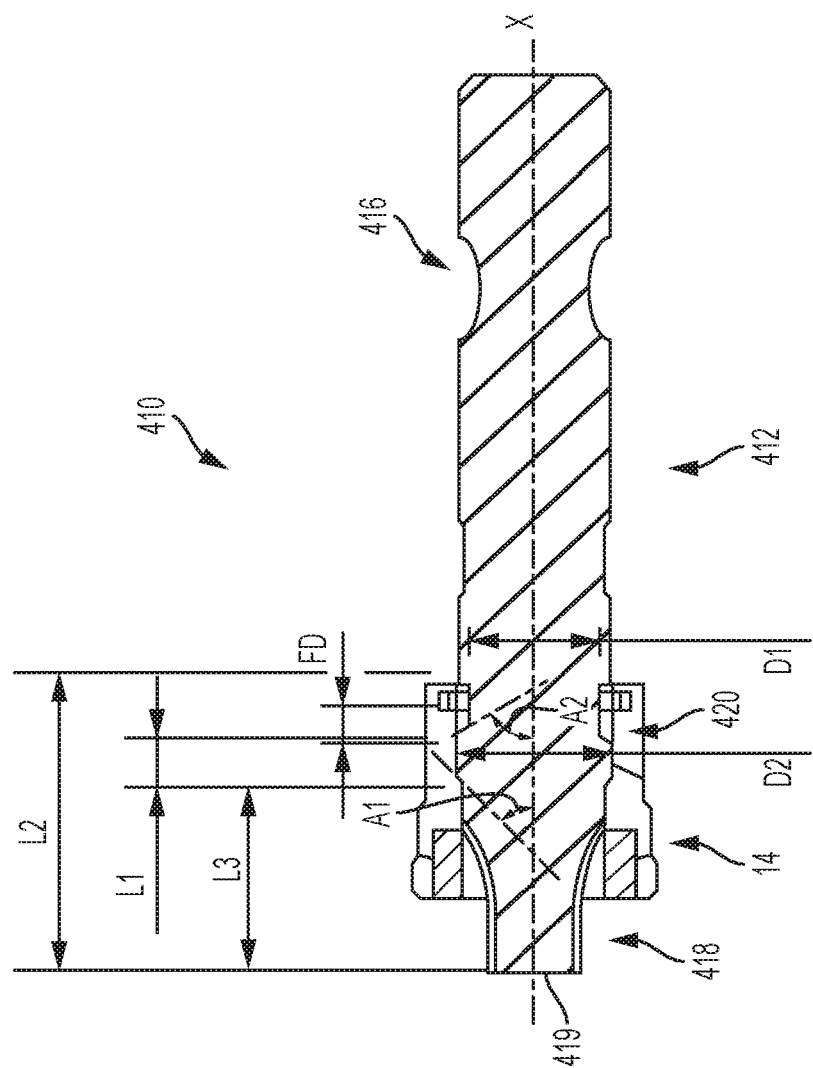
FIG. 7B is cross-sectional view of the tool bit and floating magnet sleeve of FIG. 7A, taken along line 7B-7B.
Figure 7C:
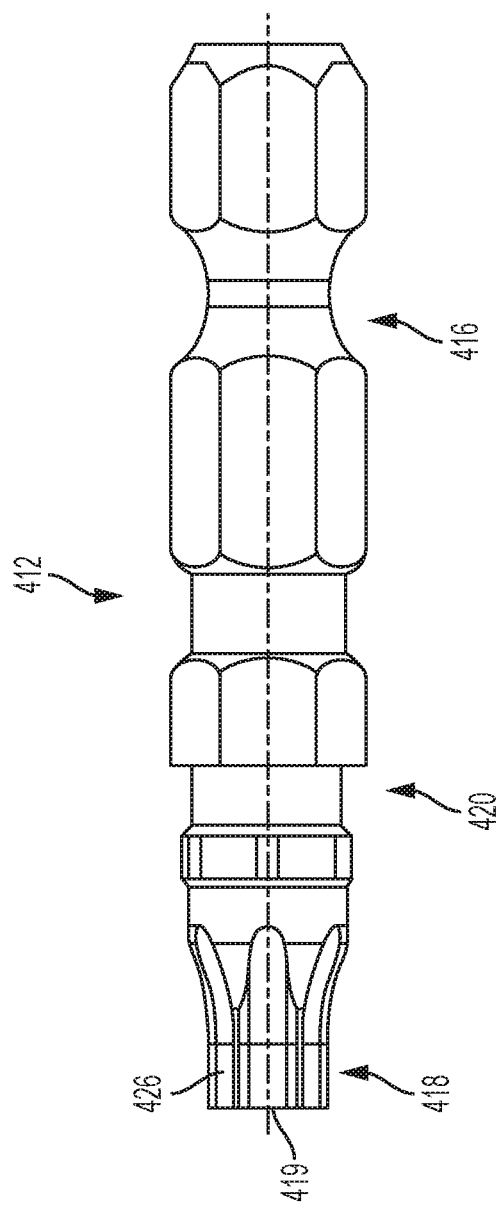
FIG. 7C is side view of the tool bit of FIG. 7A.
Figure 7D:
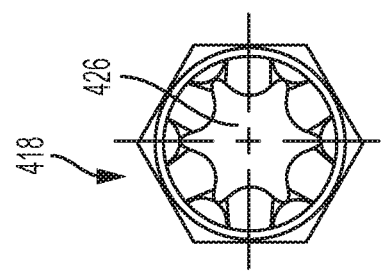
FIG. 7D is a front view of the tool bit of FIG. 7C.

Referring to FIGS. 7A-7C, in another embodiment, a tool 410 for driving threaded fasteners includes a tool bit 412, similar to tool bit 12, and the same floating magnet sleeve 14, which can also be removably received over the tool bit 412. The tool bit 412 extends along a longitudinal axis X and includes a rear shank portion 416, a front working end 418, and an intermediate portion 420 between the rear shank portion 416 and the front working end 418. The rear shank portion 416 is identical to the rear shank portion 16 in the tool bit 12. The front working end 418 differs from the working end 16 of the tool bit 12 insofar as it has a Torx® T25 geometry 326 for engaging a Torx® T25 head of a threaded fastener. The intermediate portion 420 has the same configuration as the intermediate portion 20, except that the dimensions and angles have been modified so that the bit has been optimized so that the floating magnet sleeve 14 will engage and work with at least 80% of fasteners with Torx® T25 heads. The optimized dimensions for the Torx® T25 embodiment of the tool bit 412 are set forth in Table 1 below.

TABLE 1

(all linear dimensions in mm, all angles in degrees, ranges shown with example embodiments in parentheses)

| Tool Bit | Dmin | Dmax | TD | FD | FD/TD (%) | L1 | L2 | L3 |
|---|---|---|---|---|---|---|---|---|
| PH2 | 1.7 | 2.5 | 2.5 to 4.0 (3.43) | 2.0 to 2.1 (2.02) | 53-72 (59) | 1.4 to 1.7 (1.55) | 12 to 14 (13) | 7 to 9 (8.57) |
| SQ2 | 1.65 | 2.48 | 2.48 to 4.0 (3.00) | 1.3 to 1.4 (1.35) | 40-52 (45) | 2.1 to 2.5 (2.24) | 12 to 14 (12.6) | 7 to 9 (8.12) |
| T20 | 1.4 | 2.17 | 2.17 to 3.5 (2.57) | 1.1 to 1.2 (1.17) | 40-51 (46) | 2.1 to 2.5 (2.27) | 12 to 14 (12.2) | 7 to 9 (7.84) |
| T25 | 1.31 | 1.99 | 1.99 to 3.0 (2.30) | 1.5 to 1.6 (1.55) | 53-75 (67) | 1.8 to 2.2 (1.99) | 12 to 14 (12.9) | 7 to 9 (8.5) |

| Tool Bit | D1 | D2 | D3 | A1 | A2 | A3 |
|---|---|---|---|---|---|---|
| PH2 | 5 to 5.9 (5.45) | 6 to 6.9 (6.4) | 7 to 8 (7.18) | 40 to 50 (45) | 60 to 70 (65) | 80 to 100 (90) |
| SQ2 | 5 to 5.9 (5.45) | 6 to 6.9 (6.4) | 7 to 8 (7.18) | 40 to 50 (45) | 60 to 70 (65) | 80 to 100 (90) |
| T20 | 5 to 5.9 (5.45) | 6 to 6.9 (6.4) | 7 to 8 (7.18) | 40 to 50 (45) | 60 to 70 (65) | 80 to 100 (90) |
| T25 | 5 to 5.9 (5.45) | 6 to 6.9 (6.4) | 7 to 8 (7.18) | 40 to 50 (45) | 60 to 70 (65) | 80 to 100 (90) |

Advantage of the above-described embodiments include at least the following. The front shoulder of the tool bits allows the floating magnet sleeve to be installed onto the tool bit easily, and retained during use. The dimensions and configuration of the annular groove allows floating magnet sleeve to jump forward to virtually all fasteners for greater retention and single handed use. The tool bit with the floating magnet sleeve have a narrow width to easily see work and provide access to cramped spaces. The tool bit has an overall length of 41 mm or 1.61", which will outperform a standard 1" tool bits in torsion.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A tool for driving threaded fasteners comprising:
a tool bit extending along a longitudinal axis and including a rear shank of polygonal cross section configured to be coupled to a tool bit holder of a power tool, a front working end configured to engage a head of a threaded fastener, and an intermediate portion between the rear shank portion and the front working end, the intermediate portion including a front shoulder proximate the working end, a rear shoulder proximate the shank, and a reduced diameter annular groove disposed between the front shoulder and the rear shoulder; and
a floating magnet sleeve receivable over the tool bit and including a tubular body, retention member projecting radially inward from a rear end of the body, and a magnet disposed at a front end of the body, the sleeve removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position,
wherein the float distance is less than a tip distance between a front end of the magnet and a front tip of the working end when the sleeve is in the rearward position.

2. The tool of claim 1, wherein the tip distance is greater than or equal to a maximum depth to which the working end penetrates a head of a threaded fastener.

3. The tool of claim 2, wherein the tip distance minus the float distance is less than or equal to a minimum depth to which the working end penetrates a head of a threaded fastener.

4. The tool of claim 3, wherein: (a) the working end is a PH2 head, the tip distance is between approximately 2.50 mm and approximately 3.77 mm, and the float distance is approximately 2.02 mm; (b) the working end is a SQ2 head, the tip distance is between approximately 2.48 mm and 3.00 mm, and the float distance is approximately 1.35 mm; (c) the working end is a T20 head, the tip distance is between approximately 2.17 mm and 2.57 mm, and the float distance is approximately 1.17 mm; or (d) the working end is a T25 head, the tip distance is between approximately 2.49 mm and 3.33 mm, and the float distance is approximately 1.55 mm.

5. The tool of claim 3, wherein the tip distance and the float distance are configured so that the floating magnet sleeve will float to engage the heads of at least 80% of the fasteners of a type engageable by the working end.

6. The tool of claim 1, wherein the magnet comprises a ring shaped magnet disposed in a front end of the sleeve.

7. The tool of claim 1, further comprising a reduced diameter torsion zone disposed between the shank and the rear shoulder.

8. A tool for driving threaded fasteners comprising:
a tool bit extending along a longitudinal axis and including a rear shank of polygonal cross section configured to be coupled to a tool bit holder of a power tool, a front working end configured to engage a head of a threaded fastener, and an intermediate portion between the rear shank portion and the front working end, the intermediate portion including a front shoulder proximate the working end, a rear shoulder proximate the shank, and a reduced diameter annular groove disposed between the front shoulder and the rear shoulder; and
a floating magnet sleeve receivable over the tool bit and including a tubular body, retention member projecting radially inward from a rear end of the body, and a magnet disposed at a front end of the body, the sleeve removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position,
wherein the annular groove has a first diameter, the front shoulder has a second diameter that is greater than the first diameter, and the rear shoulder has a third diameter that is greater than the second diameter.

9. The tool of claim 8, wherein the first diameter is approximately 5.0 mm to approximately 5.9 mm, the second diameter is approximately 6.0 mm to approximately 6.9 mm, and the third diameter is approximately 7.0 mm to approximately 8.0 mm.

10. The tool of claim 8, wherein the annular groove has a circular cross-section with the first diameter measured across the circular cross-section, the front shoulder has a partially circular and partially polygonal cross-section with the second diameter being measured at a maximum distance across the partially circular and partially polygonal cross-section, and the rear shoulder has a polygonal cross-section with the third diameter being measured at a maximum distance across the polygonal cross section.

11. The tool of claim 10, wherein the polygonal cross-section of the rear shoulder is a hexagonal cross-section and the third diameter is measured from one vertex to an opposite vertex on the hexagonal cross-section.

12. The tool of claim 8, wherein the magnet comprises a ring shaped magnet disposed in a front end of the sleeve.

13. The tool of claim 8, further comprising a reduced diameter torsion zone disposed between the shank and the rear shoulder.

14. A tool for driving threaded fasteners comprising:
a tool bit extending along a longitudinal axis and including a rear shank of polygonal cross section configured to be coupled to a tool bit holder of a power tool, a front working end configured to engage a head of a threaded fastener, and an intermediate portion between the rear shank portion and the front working end, the intermediate portion including a front shoulder proximate the working end, a rear shoulder proximate the shank, and a reduced diameter annular groove disposed between the front shoulder and the rear shoulder; and
a floating magnet sleeve receivable over the tool bit and including a tubular body, retention member projecting radially inward from a rear end of the body, and a magnet disposed at a front end of the body, the sleeve removably receivable over the tool bit with the retention member disposed in the annular groove between the front shoulder and the rear shoulder such that the sleeve is axially moveable by a float distance between a rearward position where the retention member abuts the rear shoulder and a forward position where the retention member abuts the front shoulder, such that the magnet can engage a fastener head coupled to the working end as the sleeve approaches the forward position,
wherein the front shoulder has a first ramped portion at a front end of the front shoulder adjacent the working end and a second ramped portion at a rear end of the front shoulder adjacent the annular groove, the first ramped portion being disposed at a first angle to the longitudinal axis, the second ramped portion being disposed at a second angle to the longitudinal axis, wherein the first angle is less than the second angle so that installation of the sleeve over the front shoulder requires less axial force than removal of sleeve over the front shoulder.

15. The tool of claim 14, wherein the first angle is approximately 45 degrees and the second angle is approximately 65 degrees.

16. The tool of claim 14, wherein a front end of the rear shoulder is disposed at a third angle to the longitudinal axis that is greater than both the first angle and the second angle.

17. The tool of claim 16, wherein the front end of the rear shoulder is approximately perpendicular to the longitudinal axis.

18. The tool of claim 14, wherein the annular groove has a first diameter, the front shoulder has a second diameter that is greater than the first diameter, and the rear shoulder has a third diameter that is greater than the second diameter.

19. The tool of claim 14, wherein the magnet comprises a ring shaped magnet disposed in a front end of the sleeve.

20. The tool of claim 14, further comprising a reduced diameter torsion zone disposed between the shank and the rear shoulder.

* * * * *